UNITED STATES PATENT OFFICE.

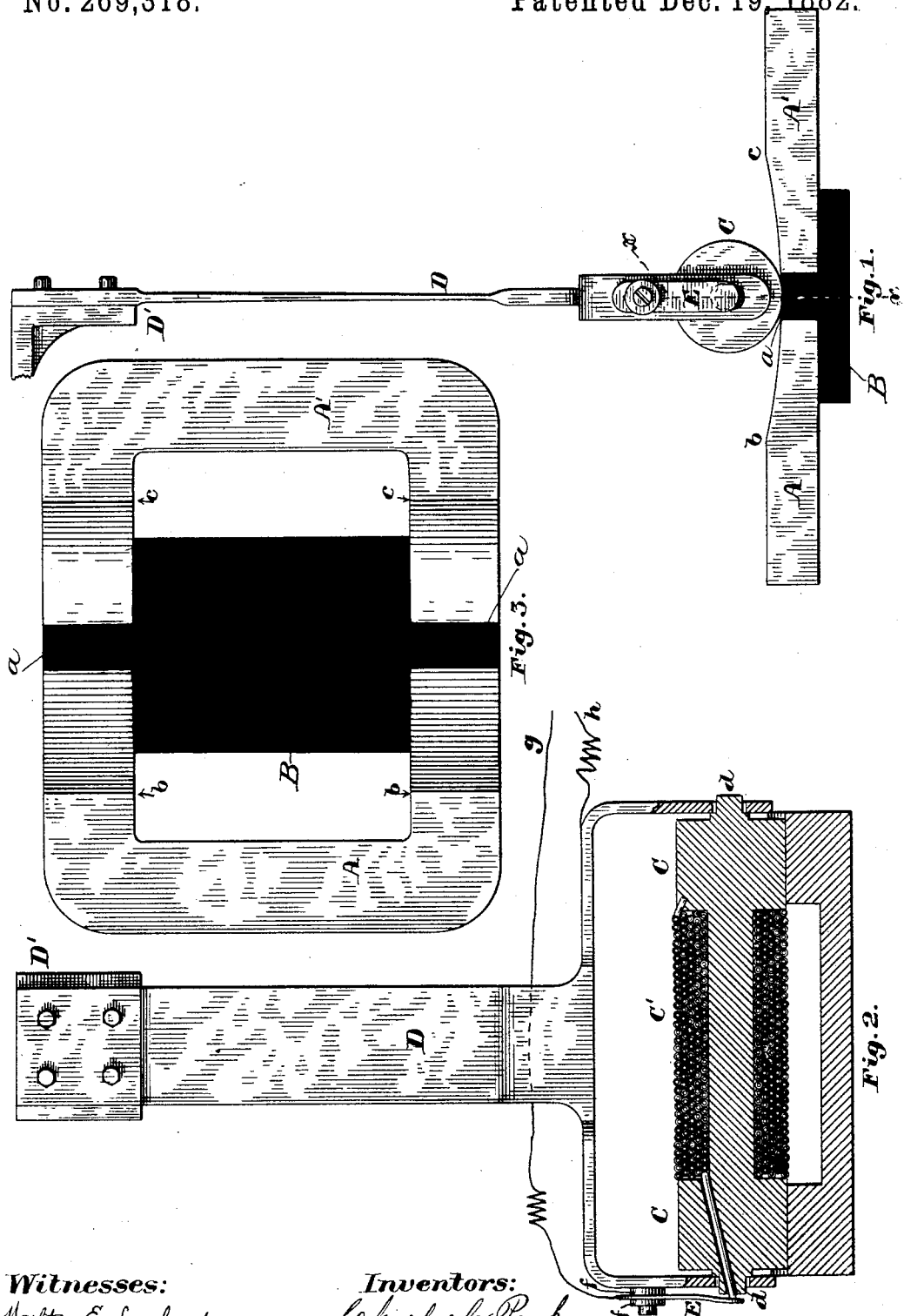

CHARLES C. PECK AND WILLIAM H. CHAPMAN, OF MIDDLEBURY, VERMONT.

ELECTRO-MAGNETIC MOTOR.

SPECIFICATION forming part of Letters Patent No. 269,318, dated December 19, 1882.

Application filed April 21, 1882. (No model.)

*To all whom it may concern:*

Be it known that we, CHARLES C. PECK and WILLIAM H. CHAPMAN, both of Middlebury, in the county of Addison and State of Vermont, have invented certain new and useful Improvements in Magnetic Power-Transmuters, of which the following, taken in connection with the accompanying drawings, is a specification.

Our present invention relates to an improved construction and arrangement of the armature and magnets of a magnetic power-transmuter, and is an improvement upon the armature and magnets shown and described in another application of ours of even date herewith; and it consists, first, of a soft-iron armature wound with a coil of conducting-wire, and provided with journals, and mounted in bearings in a spring radius-arm, so that it may be vibrated in a curved path and at the same time oscillates or revolves about its axis in close contact with the poles of the magnets, as will be further described.

It further consists in the employment of two U-shaped magnets arranged with their ends toward each other, but their poles in opposition to each other, and having the upper surfaces of their arms made to conform to the curve of vibration of the armature common to both.

It further consists in the combination of a soft-iron armature mounted upon a spring radius-arm in which it oscillates or revolves while it vibrates therewith, and a pair of magnets arranged with their poles in opposition to each other and having one of their sides made to conform to the curve of vibration of said armature, as will be described.

It further consists in the combination of a cylindrical soft-iron armature mounted so as to revolve or oscillate in and vibrate with a spring radius-arm, and wound with a coil of conducting-wire, one end of which is electrically connected to said armature, and the other end, which projects through said armature at its axis, is insulated therefrom, and a contact-spring bearing upon said projecting wire and secured to, but insulated from, the radius-arm, as will be described.

Figure 1 of the drawings is an end elevation of our improved armature and magnets. Fig. 2 is a sectional elevation, the cutting-plane being on line $x\,x$ on Fig. 1; and Fig. 3 is a plan of the magnets and their supporting-bed.

A and A' are two U-shaped magnets, firmly secured to the bed-plate B, made of brass or other suitable non-magnetic material, and provided with the upwardly-projecting lugs $a\,a$, which fill the spaces between the ends of the magnets, as shown. The upper sides of the two arms of each magnet and of the two lugs $a$ are cut away from $b$ to $c$ to form curved surfaces, as shown in Fig. 1.

C is a soft-iron armature, made in the form of a cylindrical spool, and provided at each end with a journal, $d$, by means of which it is mounted in the forked end of the spring radius-arm D, the bearings for said journal being the vertically-slotted holes $e$, which permit the armature to rest at its ends upon and roll along the curved surface of the magnets as it is impelled toward one or the other extreme of the magnetic field. The spring radius-arm D has its upper end firmly secured in a fixed position to the bracket D', and is so proportioned that its natural vibration will permit the armature C to move from a position directly above the arms of one magnet to a position directly above the arms of the other magnet, and vice versa, precisely as in our other application referred to. A coil of conducting-wire, C', is wound around the central portion of the armature C, its inner end projecting through the center of one of the journals $d$, but insulated from the iron of the armature C, while its other end is in metallic contact with the iron of said armature, as shown in Fig. 3.

A metallic spring, E, is secured at one end to the fork of the radius-arm D, but insulated therefrom by the rubber-washers $f$, while its other end presses upon the end of the wire C', making metallic contact therewith, as clearly shown in Fig. 3. The spring E is connected in the electric circuit by the wire $g$, and the radius-arm C is likewise connected in the same circuit by the wire $h$, said circuit containing in it a commutator for reversing the direction of the current of electricity through the coil C', substantially as shown and described in our other application before referred to; but as this and other details form no part of our present invention it is unnecessary to further describe them here.

This oscillating armature may be used with great advantage in a generator or a motor, on account of the close contact which the armature makes with the magnets, by virtue of which all the magnetic potential is used up, which can never be done with an armature that does not touch the magnet.

The magnets A and A' may be permanent or electro magnets, as may be desired; and the end portions of the armature may be made cylindrical, as shown, or they may be of any desired shape so long as those portions which come in contact with the magnets are so curved as to permit a rocking or rolling action of said armature as it is impelled from one magnetic field to another.

What we claim as new, and desire to secure by Letters Patent of the United States, is—

1. In an electric apparatus, the combination of two pairs of magnetic poles arranged in opposition to each other, a soft-iron armature provided with a coil of conducting-wire, and two curved peripheral surfaces, all arranged to rock or roll bodily in the same direction from one magnetic field to another, and come in close contact with said magnetic poles without concussion as it is impelled from one magnetic field to the other, substantially as and for the purposes described.

2. In an electric apparatus, the combination of two pairs of magnetic poles arranged in opposition to each other, a soft-iron armature provided with a coil of conducting-wire, and two curved peripheral surfaces, all arranged to rock or roll bodily in the same direction from one magnetic field to another and come in close contact with said magnetic poles as it is impelled from one magnetic field to another, and a radius-arm connected to said armature and adapted to guide it in its movements, substantially as described.

3. The armature C, provided with journals $d$ and an electric coil, C', and mounted and adapted to be revolved or oscillated in bearings in a spring radius-arm, substantially as and for the purposes described.

4. The combination of two U-shaped magnets arranged with their poles in opposition and separated by non-magnetic material interposed between them, and having the upper surfaces of their arms curved, as set forth, for the purposes specified.

5. The combination of the armature C, mounted in bearings in the radius-arm D, and adapted to vibrate therewith and to revolve or oscillate therein, and provided with the electric coil C', and the magnets A and A', constructed, arranged, and adapted to operate substantially as described.

6. The combination of the spool-like soft-iron armature C, provided with the journals $d$, the radius-arm D, the electric coil C', and the contact-spring E, all constructed, arranged, and adapted to operate substantially as and for the purposes described.

Executed at Boston, Massachusetts, this 19th day of April, A. D., 1882.

CHARLES C. PECK.
WM. H. CHAPMAN.

Witnesses:
E. A. HEMMENWAY,
WALTER E. LOMBARD.